Jan. 17, 1961     J. H. EDMAN     2,968,353
TRACTOR-IMPLEMENT HITCH AND CONTROL SYSTEM
Filed Nov. 15, 1956     2 Sheets-Sheet 1
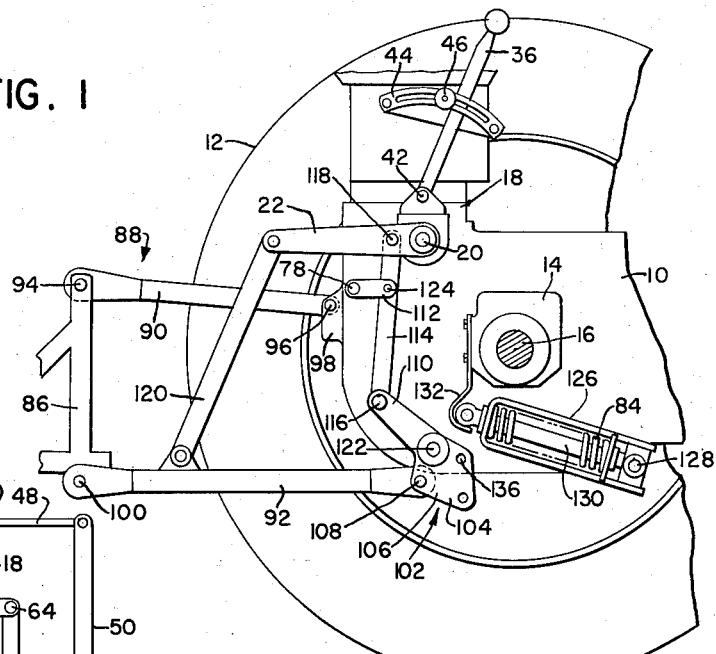
FIG. 1
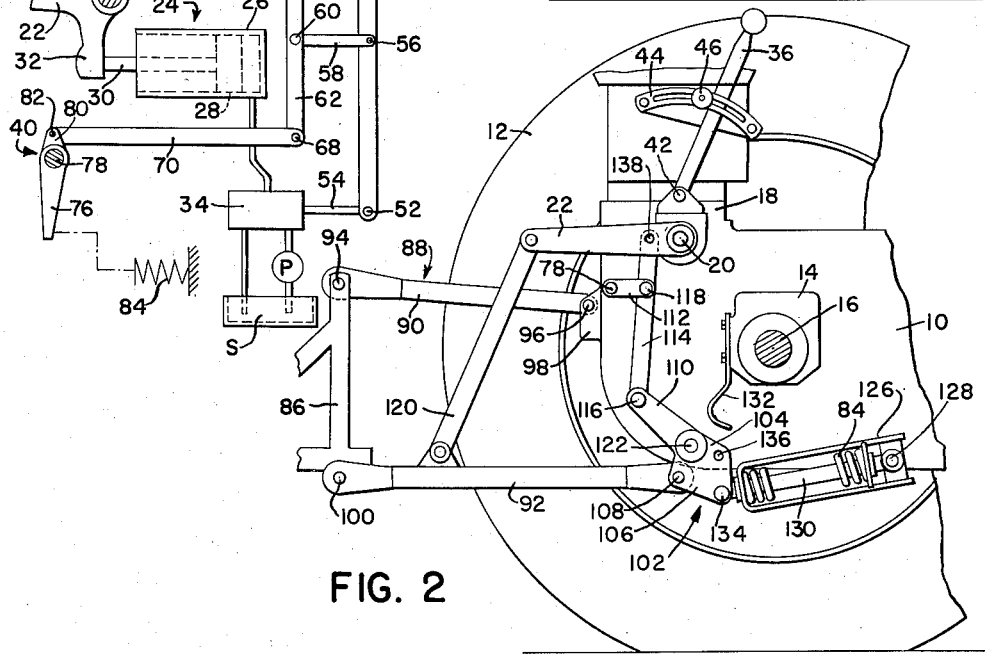
FIG. 3
FIG. 2
*INVENTOR.*
J. H. EDMAN

INVENTOR.
J. H. EDMAN

United States Patent Office 2,968,353
Patented Jan. 17, 1961

2,968,353

TRACTOR-IMPLEMENT HITCH AND CONTROL SYSTEM

John H. Edman, Waterloo, Iowa, assignor, by mesne assignments, to Deere & Company, a corporation of Delaware Filed Nov. 15, 1956, Ser. No. 622,299

16 Claims. (Cl. 172—7)

This invention relates to a hitch and control system for connecting an agricultural implement to a tractor, and more particularly the invention relates to a convertible system making possible the selection of the benefits of two generally well-known systems.

In the familiar so-called three-point draft-load control hitch system, there are certain recognized advantages, particularly those flowing from the adaptability of the load control system to the control of an implement in response to variations in soil conditions. However, there are certain known disadvantages, particularly when the system is used with relatively long implements on undulating terrain. Accordingly, customer acceptance of a particular hitch often depends upon individual desires and propensities and apparent recognition of the conditions under which the hitch will be used.

In one known type of hitch in which an articulate hitch linkage is provided between the tractor and the implement and some measure of weight-transfer between the implement and tractor is achieved, the linkage is arranged so that variations in draft load cause variations in a signal-output member movable in response to generally fore-and-aft movement of the linkage, and this signal output member is mechanically connected to the lift mechanism so as to impose forces thereon in different directions according to the direction of fore-and-aft shifting of the linkage. An example of this type of hitch is shown in the U.S. Patent to Burkholder 2,547,438. A system of this character operates entirely independent of hydraulic or other power-operated influence. In such linkage, if provided with lost-motion means, as in assignee's copending application Ser. No. 580,893, filed April 26, 1956, additional advantages are obtained in operation of the tractor and implement in rolling fields.

According to the present invention, a principal object is the provision of means whereby a hitch linkage may be converted from the general type discussed above to a form of power-operated draft control. The invention has for specific objects the provision of means whereby the conversion may be readily accomplished; means for storage of linkage control parts temporarily idle while other parts are used; and simple and relatively inexpensive means whereby the systems may be converted with little difficulty.

The foregoing and other important objects and desirable features inherent in and encompassed by the invention will become apparent from a disclosure of a preferred embodiment of the invention, by way of example, in the ensuing specification and accompanying sheets of drawings, the several figures of which are described immediately below.

Fig. 1 is a fragmentary side elevation of the rear portion of a tractor and the front portion of an associated implement interconnected by the improved linkage and control means in one stage of its conversion.

Fig. 2 is a similar view showing the other stage of the conversion.

Fig. 3 is a schematic illustration of the power-operated draft control system of the tractor.

Figure 4:
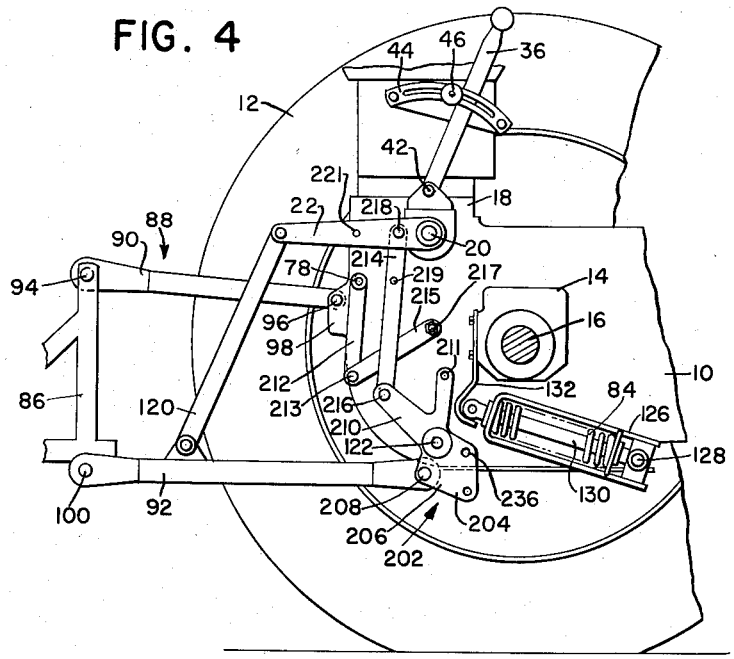
Fig. 4 is a view similar to Fig. 1 but showing a modified form of the invention.

The tractor chosen for the purposes of illustration is typical of a conventional farm tractor and has a longitudinal or fore-and-aft body 10 carried at its front end on a steerable wheeled truck (not shown) and at its rear end on a pair of traction wheels, only one of which appears at 12. The body 10 includes transverse axle structure 14 by means of which the traction wheels are journaled respectively on right and left hand axles, only the right hand one of which appears at 16.

The tractor includes a typical power-adjusting or power-lift means or system, comprising a power lift housing portion 18, a transverse rockshaft 20 carried in the housing portion 18, and a pair of lift arms secured respectively to opposite outer ends of the rockshaft 20, only one of which appears in the drawings at 22. The lift arm, in a broad sense, comprises a power-operated implement-adjusting element which moves according to control of that portion of the implement-adjusting and -control system including a power source in the form of a hydraulic motor 24 (Fig. 3) made up of a cylinder 26 and piston 28, the latter having a piston rod 30 connected to an internal arm 32 fixed to the rockshaft 20. The motor 24, as is conventional, is of the one-way type, extension of which rocks the rockshaft 20 in a clockwise direction to move the lift arm or element 22 upwardly. When fluid is exhausted from the right hand end of the cylinder, as will become presently apparent, the lift arm 22 lowers under the influence of the weight of the associated implement.

The power control system, and particularly the motor 24, is initially under the influence of an actuator or valve 34, the position of which is influenced by any one of a manual control lever 36, position-responder means 38, and draft-control signal-receiving means 40. The general arrangement follows the fundamental principles outlined in the U.S. patent to Edman 2,721,508.

In the representative embodiment illustrated here, the manual control lever 36 is conveniently pivoted, as at 42 on any suitable part of the power lift housing 18 for swinging back and forth through a range determined by a quadrant 44. The relationship between the lever 36 and the quadrant 44 is such that any selected position of the lever is retained by frictional or other conventional means. An adjustable stop 46 may be provided on the quadrant for initially determining the maximum position of the lever in an implement-lowering direction. The lever 36 is pivotally linked at 48 to a beam 50 which is pivotally connected at 52 at its opposite end to an actuator control rod 54. Hence, if it be assumed that the beam 50 is fulcrumed intermediate its ends, movement of the lever 36 will shift the actuator 34.

Such fulcrum is actually provided at 56 by means of connection of the beam 50 to a link 58 which is in turn pivoted at 60 to a second beam or lever 62. One end of the lever 62 is pivoted at 64 to a link 66 which is in turn connected to the position-responder means 38, and the other end of the lever is pivoted at 68 to a link 70 which in turn is connected to the signal-receiving means 40. The position-responder means 38 comprises an arm 72, for example, rigidly secured to the rockshaft 20 within the power lift housing 18 and pivotally connected at 74 to the link 66. The signal-receiving means may take the form, as illustrated here, of a short arm 76 fulcrumed on a rear portion of the tractor by affixation to a transverse rockshaft 78. Additionally fixed to the rockshaft 78 is an arm 80 which is pivotally connected at 82 to the link 70 of the control means. As will be brought out below, rocking of the signal-receiving arm 76 is opposed by biasing means shown schematically at 84 in Fig. 3 and illustrated by means of a dot-dash line as being mechanically connected to the arm 76. In brief, the arrangement is such that rocking of the rockshaft 20 is proportional to the position of the lever 36, because, after the lever 36 is initially moved to a selected position to open the valve 34, the follow-up linkage 66—62—58—50 between the valve 34 and the position-responder means 38 returns the valve to neutral. Likewise, the neutrally positioned valve 34 is shiftable in response to rocking of the rockshaft 78 against the bias of the spring 84, and the activating linkage 70—62—58—50 shifts the valve in the proper direction, after which it is restored to neutral by a combination of the position-responder means and modification of the force that caused actuation of the load-responder or signal-receiving means in the first place. The control mechanism just described is typical of well-known systems and is particularly adapted to a hydraulic system as illustrated, which system is completed by a pump P and a reservoir or sump S.

The implement is represented at 86 by a forward frame portion thereof, this portion being sufficient, in view of the conventional nature of implements in general, to orient the principles of the present invention. As is known to those versed in the art, the implement may include one or more earth-working tools, such as plow bottoms (not shown). The hitch linkage by means of which the implement 86 is connected to the tractor is indicated in its entirety by the numeral 88 and comprises a first or top link 90 and a pair of second or lower links 92, only one of which is shown and described, since it will be clear that the arrangements to follow are duplicated at opposite sides of the tractor and hitch. The top or upper link 90 has rear end connecting means including a pivot at 94 on a transverse axis to an upper portion of the implement 86, and has front end connecting means including a pivot on a transverse axis at 96 which effects a connection directly to a rear portion 98 of the tractor body 10. The rear end connecting means for each lower link 92 includes a pivot at 100 on a transverse axis to the lower portion of the implement 86 and further includes front end connecting means 102, one at each side of the tractor. Each means includes a shiftable member in the form of a rockable bell crank 104 which serves as a signal output member, as will be explained below. This bell crank has a first arm 106 by means of which a transverse pivotal connection is made at 108 to the front end of the lower link 92, and further has a second arm 110 which is optionally connectible directly to the linkage 88 or to a control arm 112 keyed or otherwise affixed to the external end of the signal-receiving means rockshaft 78 in lieu of the arm 76.

Fig. 1 shows that stage of duality or conversion of the system in which the bell crankarm 110 at each side of the tractor is connected to the linkage 88 by means of a force-transmitting means, here in the form of a link 114, pivotally connected at one end at 116 to the signal output member arm 110 and pivotally and releasably connected at 118 at its other end to the lift arm 22. Since the lift arm 22 is connected by a lift means or lift link 120 to the lower link 92, the force-transmitting link 114 is in effect, in this position, connected to the linkage 88.

Shiftability or rockability of the signal output members 104 at opposite sides of the tractor is effected by the mounting thereof on the tractor body by means of a transverse pivot shaft 122. By this construction, the implement 86 is lifted by the lift arms 22 through the media of the lift links 120 and hitch linkage 88, the involved pivots being those at 94, 96, 100 and 108. During normal operation of the tractor and its associated implement 86, fore-and-aft forces developed in the linkage 88 are reflected in rocking of the means 102, specifically the bell crank 104, and these forces are transmitted by means of the links 114 to the lift arms 22 via the connections 118. It should be noted in Fig. 1 that although the external control arm 112 on the signal-receiving means rockshaft 78 extends in overlapping relationship to the link 114, the link and arm are not interconnected, the small circle at the front end of the arm 112 representing an aperture 124 which is usable in the conversion shown in Fig. 2. Hence, and having reference again to Fig. 1, the force-transmitting connections 114 are connected respectively between the means 102 and the lift arms 22 independently of the draft control system of the tractor.

The arrangement just described enables achievement of all those advantages attributable to a linkage system in which variations in draft load between the tractor and the implement are not influenced at all by the hydraulic or other power system on the tractor but depend for actuation upon forces developed in the interconnecting linkage. For example, in a normal plowing operation, the draft force exerted on the tractor depends, of course, upon the soil resistance and the line of draft, but in any rate tensional forces, at least, will be developed in the lower links 92, causing the bell cranks 104 to tend to rotate in a clockwise direction, thereby imposing upwardly directed forces through the links 114 to the lift arms 22. These arms, being connected to the linkage 88 by means of the lift links 120 to the lower links 92, tend to exert a lifting force on the front end of the implement. This lifting force is utilized as a transfer of implement weight to the tractor and thus improves traction thereof.

During the phase of operation of the hitch and control system as shown in Fig. 1, each bell crank 104 is uneffected by the draft control spring 84 which, as shown, is contained in a cage 126 having a pivotal connection at 128 so as to be bi-positionable, having the two positions shown respectively in Figs. 1 and 2. The biasing means afforded by each spring 84, its cage 126 and a spring-opposed plunger or rod 130, is retained in one position (Fig. 1) by releasable means in the form of a spring clip 132 which engages the apertured free end of the plunger 130.

When it is desired to convert the system to draft control, each biasing means is moved to its Fig. 2 position and the free end of its rod 130 is pivotally connected at 134 to one of a plurality of openings 136 in the associated bell crank 104, depending upon the type of load expected to be encountered. At the same time, each connection 118 is removed between its force-transmitting link 114 and the associated lift arm 22 and is used to connect the link 114 to the associated signal-receiving means control arm 112, leaving unused an aperture 138 in the arm 22, which aperture in Fig. 1 receives the connection pin 118. Consequently, in Fig. 2, each force-transmitting link 114 is connected to the draft control system independently of the lift arms 22, and shifting of the signal output members or bell cranks 104 is opposed by the springs 84 in at least one direction. As will be seen, increases in draft load on the implement will result in tensional forces in the links 92, which forces are opposed by the biasing means or springs 84, hence controlling rocking of the bell cranks. Such rocking or shifting of the bell cranks is transmitted to the load control system via the links 114 which are now connected at 118 to the signal-receiving means 40 (Fig. 3) and, hence, variations in draft load are reflected by actuation of the actuator or valve 34 to control the motor 24 which in turn moves the lift arms 22 to correctively adjust the operating depth of the implement. It will be clear of course that the conversion is made at both sides of the system; that is, the draft control and hitch feed backs are not used simultaneously.

As just stated, the draft control system is responsive to tensional forces in the lower links, and the top link 90 in this case is directly pivotally connected to the tractor at 96—98. Similar results can be obtained of course by utilizing the top link 90 in compression as in the conventional draft control system, in which case the internal arm 76 on the load signal rockshaft 78 will be opposed by a spring such as that at 84 (suggested in Fig. 3).

As will be appreciated, the conversion from the arrangement of Fig. 1 to that of Fig. 2 is readily accomplished. Each link 114 may be considered permanently pivoted to its bell crank arm 110 at 116 and all that is required is a change in each connection 118. In Fig. 1, as already explained, the connection 118 is effected between the associated force-transmitting link 114 and the lift arm 22, leaving the signal-receiving means arm 112 free of the link 114. In Fig. 2, each connection 118 is changed from the Fig. 1 position so that it effects a connection between its force-transmitting link 114 and the associated force-receiving arm 112 for the draft control means, leaving the link 114 free of the arm 122. At the same time that each connection 118 is changed between the Figs. 1 and 2 positions, each biasing means 84 is also changed. In other words, when the force-transmitting links 114 are connected at 118 to the respective lift arms 22, the biasing means 84 are preferably not connected to the bell crank 104, whereas just the reverse is true in the arrangement of Fig. 2 for draft control.

Figure 5:
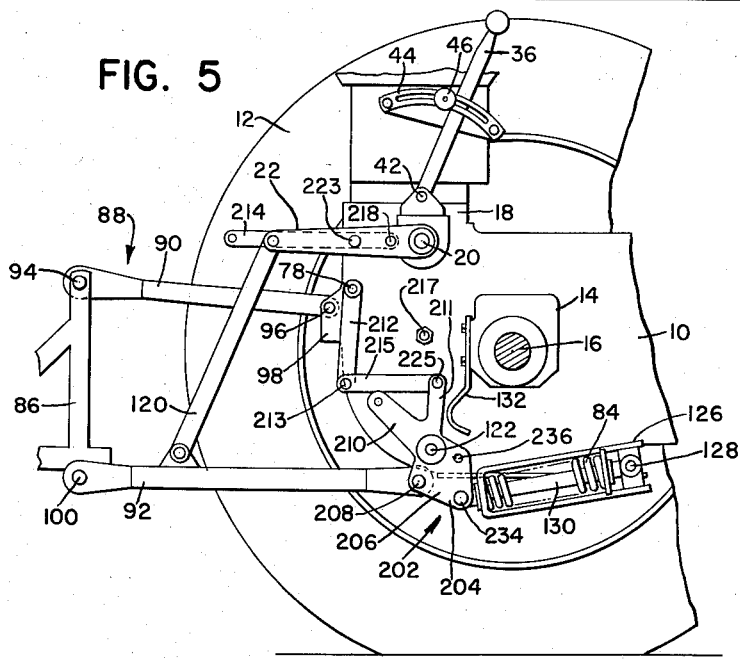
Fig. 5 is a view similar to Fig. 4 but showing a change in the duality of the linkage and control system.

The embodiment shown in Figs. 4 and 5 is quite similar to that shown in Figs. 1 and 2 and the tractor includes the draft or load control system of Fig. 3. The basic difference is in the means for effecting the conversion. Hence, to the extent that the two modifications are similar, identical reference characters will be used but, where differences exist, reference characters will be used in the two-hundred series as distinguished from the use of the one-hundred series in Figs. 1 and 2. Again, the arrangement is duplicated at opposite sides of the tractor.

With the foregoing in mind, it will be noted that the front end connecting means for the front end of each lower link 92 is shown at 202 as including a signal output member or bell crank 204 pivoted to the tractor by the shaft 122. This bell crank has a lower arm 206 by means of which a pivotal connection 208 is made to the front end of the lower link 92 on a transverse axis. The bell crank 204, as distinguished from the bell crank 104, has two long arms, here indicated at 210 and 211. In Fig. 4, the means 202 is preferably free from action of the biasing means 84, the retention of which in its inactive position is the same as that in Fig. 1. In Fig. 5, the means 202 cooperates with the biasing means 84, the bell crank 204 having a plurality of openings 236 therein by means of which a connection may be made at 234 between the bell crank 204 and the biasing means plunger or rod 130.

The signal-receiving means rockshaft 78, instead of having the external arm 112, has an external arm 212 keyed thereto and this arm, unlike the arm 212, extends downwardly from the rockshaft 78, being pivotally connected at 213 at its lower end to a link 215 which, in Fig. 4, is capable of being temporarily stored in an idle position, as by releasable means 217 connected to the tractor body. Hence, the draft control system is deactivated, since, in addition to the securing of the link 215 in its storage position by the means 217, the biasing means 84 is retained in an inactive position by the spring clip retaining means 132. Likewise, the arm 211 on the bell crank 204 is not used at this time.

However, the arm 210 of the bell crank is utilized to transmit the signal output of the means 202 to the lift arm 22 through force-transmitting means in the form of a link 214, this link being pivotally connected at 216 to the arm 210 and pivotally connected at 218 to the arm 22. Operation of Fig. 4 follows that of Fig. 1, to the extent that the means 202 transmits force through the link 214 to the arm 22 in a manner comparable to the transmission of force by the link 114 from the means 102 to the arm 22 in Fig. 1.

When the arrangement is converted to that of Fig. 5, the connection at 216 between the link 214 and the bell crank arm 210 is released and, if desired, the link 214 may be moved to a storage position in which apertures 219 and 221 respectively in the link 214 and arm 22 receive a releasable connecting means 223. The draft signal transmitting link 215 is released from its storage connection at 217 and is swung downwardly for connection at 225 to the other arm 211 on the bell crank 204. The biasing means 84 is swung downwardly from its retained position of Fig. 4 so that the connection at 234 is effected between the biasing means rod 130 and the bell crank 204. The system is now converted to draft or load control and the operation follows that described in connection with Fig. 2, in which respect it will be noted that increases in draft load in both cases cause counterclockwise rocking of the signal-receiving rockshaft 78.

Since the functional and structural attributes of the two forms of the invention are similar, and since those of Figs. 1 and 2 have been covered above, it is deemed unnecessary to repeat the same as to Figs. 4 and 5. Suffice it to say that both forms of the invention present a readily convertible system making available to the user the advantages of the two types of draft and control mechanism. Features of the invention not categorically enumerated will readily occur to those versed in the art, as will many modifications and alterations in the preferred embodiments illustrated, all of which may be achieved without departure from the spirit and scope of the invention.

What is claimed is:

1. For a tractor and associated implement wherein the tractor includes a power-operated lift arm, an actuator for starting and stopping said arm and a draft-control signal-receiving means for controlling the actuator, the improvement comprising: hitch linkage including upper and lower fore-and-aft hitch links between the tractor and implement and having rear ends pivotally connected to the implement on transverse axes and having front ends adjacent to the tractor; upper means pivotally connecting the upper link front end to the tractor on a transverse axis; lower means connecting the lower link front end to the tractor and including a rockable signal output member pivoted to the tractor on a transverse axis and pivoted also to the lower link front end on a transverse axis whereby the linkage is vertically swingable and whereby the lower link is shiftable fore-and-aft in response to variations in draft load so as to rock the signal output member; biasing means optionally connectible or disconnectible between the tractor and the signal output member and operative when connected to yieldingly oppose rocking of said member in at least one direction; a lift connection between at least one of the links and the lift arm for incurring vertical swinging of the links and implement by movement of said arm; and signal transfer means optionally connectible between the signal output member and the signal-receiving means, when the biasing means is connected, for controlling the actuator according to draft loads, or between the signal output member and the lift arm independently of the signal-receiving means when the biasing means is disconnected and serving as a direct mechanical force-transmitting element for converting rocking of said member into a lifting force on the hitch linkage via the lift arm and lift connection.

2. The invention defined in claim 1, in which: the rockable member is a bell crank having one arm connected to the lower link front end to afford said lower link front end pivot axis and having another arm receiving the force-transmitting means.

3. The invention defined in claim 1, in which: the biasing means is shiftable on the tractor between a first position when connected to the signal output member and a second position when disconnected from said signal output member; and the tractor includes releasable means for storing the biasing means in its second position.

4. The invention defined in claim 1, in which: the force-transmitting means comprises a single link connected to the signal output member at one end and having its other end optionally connectible to either the lift arm or the draft-load signal-receiving means.

5. For a tractor and associated implement wherein the tractor includes a power-operated lift arm, an actuator for starting and stopping said arm and a draft-control signal-receiving means for controlling the actuator, the improvement comprising: hitch linkage including upper and lower fore-and-aft hitch links between the tractor and implement and having rear ends pivotally connected to the implement on transverse axes and having front ends adjacent to the tractor; first means pivotally connecting the front end of one link to the tractor on a transverse axis; second means connecting the front end of the other link to the tractor and including a signal output member carried by and connected to the tractor for movement relative to the tractor and pivoted to said other link front end on a transverse axis whereby the linkage is vertically swingable and whereby said other link is shiftable fore-and-aft in response to variations in draft load so as to shift the signal output member; biasing means optionally connectible or disconnectible between the tractor and the signal output member and operative when connected to yieldingly oppose shifting of said member in at least one direction; a lift connection between at least one of the links and the lift arm for incurring vertical swinging of the links and implement by movement of said arm; and signal transfer means optionally connectible between the signal output member and the signal-receiving means, when the biasing means is connected, for controlling the actuator according to draft loads, or between the signal output member and the lift arm independently of the signal-receiving means when the biasing means is disconnected and serving as a direct mechanical force-transmitting element for converting rocking of said member into a lifting force on the hitch linkage via the lift arm and lift connection.

6. The invention defined in claim 5, in which: the shiftable member is a bell crank rockably connected to the tractor and having one arm connected to said other link front end to afford said other link front end pivot axis and having another arm receiving the force-transmitting means.

7. The invention defined in claim 5, in which: the biasing means is shiftable on the tractor between a first position when connected to the signal output member and a second position when disconnected from said signal output member; and the tractor includes releasable means for storing the biasing means in its second position.

8. The invention defined in claim 5, in which: the force-transmitting means comprises a single link connected to the signal output member at one end and having its other end optionally connectible to either the lift arm or the draft-load signal-receiving means.

9. For a tractor and associated implement wherein the tractor includes an implement-adjusting and -control system having a movable power-operated adjusting element, an actuator for starting and stopping said element, and load-signal-receiving means for controlling said actuator, the improvement comprising: vertically shiftable hitch linkage having rear end means connected to the implement and front end means for connection to the tractor to connect the implement in trailing relation to the tractor, said front end means mounting a portion of said linkage on the tractor for fore-and-aft shifting according to variations in draft load between the tractor and implement and said front end means further including a signal output member connected to and movable relative to the tractor in response to fore-and-aft shifting of said linkage portion; biasing means optionally connectible or disconnectible between the tractor and said member and operative when connected to yieldingly oppose movement of said member in at least one direction; means connecting the linkage to the adjusting element for effecting vertical adjustment of the linkage by movement of said element; and force-transmitting means optionally connectible between the signal output member and the load-signal-receiving means, when the biasing means is connected, for controlling the tractor control system according to implement-to-tractor draft loads, or between the signal output member and the adjusting element, when the biasing means is disconnected for transmitting movement of said member directly to the element independently of the load-signal receiving means.

10. For a tractor and associated implement wherein the tractor includes an implement-adjusting and -control system having a movable power-operated adjusting element, an actuator for starting and stopping said element, and load-signal-receiving means for controlling said actuator, the improvement comprising: hitch linkage having rear end means connected to the implement and front end means for connection to the tractor to connect the implement in trailing relation to the tractor and for adjustment relative to the tractor, said front end means mounting a portion of said linkage on the tractor for fore-and-aft shifting according to variations in operating load between the tractor and implement and said front end means further including a signal output member connected to and movable relative to the tractor in response to fore-and-aft shifting of said linkage portion; biasing means optionally connectible or disconnectible between the tractor and said member and operative when connected to yieldingly oppose movement of said member in at least one direction; means connecting the linkage to the adjusting element for effecting adjustment of the linkage by movement of said element; and force-transmitting means optionally connectible between the signal output member and the load-signal-receiving means, when the biasing means is connected, for controlling the tractor control system according to implement-to-tractor operating loads, or between the signal output member and the adjusting element, when the biasing means is disconnected for transmitting movement of said member directly to the element independently of the load-signal-receiving means.

11. For a tractor and associated implement wherein the tractor includes an implement-adjusting and -control system having a movable power-operated adjusting element, an actuator for starting and stopping said element, and load-signal-receiving means for controlling said actuator, the improvement comprising: hitch linkage having rear end means connected to the implement and front end means for connection to the tractor to connect the implement in trailing relation to the tractor and for adjustment relative to the tractor, said front end means mounting a portion of said linkage on the tractor for fore-and-aft shifting according to variations in operating load between the tractor and implement and said front end means further including a signal output member connected to and movable relative to the tractor in response to fore-and-aft shifting of said linkage portion; biasing means connected between the tractor and said member and operative to yieldingly oppose movement of said member in at least one direction; means connecting the linkage to the adjusting element for effecting adjustment of the linkage by movement of said element; and force-transmitting means optionally connectible between the signal output member and the load-signal-receiving means for controlling the tractor control system according to implement-to-tractor operating loads, or between the signal output member and the adjusting element for transmitting movement of said member directly to the element independently of the load-signal-receiving means.

12. For a tractor and associated implement wherein the tractor includes an implement-adjusting and -control system having a movable power-operated adjusting element, an actuator for starting and stopping said element, and load-signal-receiving means for controlling said actuator, the improvement comprising: hitch linkage having rear end means connected to the implement and front end means for connection to the tractor to connect the implement in trailing relation to the tractor and for adjustment relative to the tractor, said front end means mounting a portion of said linkage on the tractor for fore-and-aft shifting according to variations in operating load between the tractor and implement and said front end means further including a signal output member connected to and movable relative to the tractor in response to fore-and-aft shifting of said linkage portion; means connecting the linkage to the adjusting element for effecting adjustment of the linkage by movement of said element; and mechanism for utilizing implement-to-tractor operating loads selectively in either a power-operated phase or a mechanical weight-transfer phase, including force-transmitting means optionally connectible between the signal output member and the load-signal-receiving means for achieving the power-operated phase by controlling the tractor control system according to implement-to-tractor operating loads, or between the signal output member and the adjusting element for achieving the mechanical weight-transfer phase by transmitting movement of said member directly to the element independently of the load-signal-receiving means.

13. For a tractor and associated implement wherein the tractor includes an implement-adjusting and -control system having a movable power-operated adjusting element, an actuator for starting and stopping said element, and load-signal-receiving means for controlling said actuator, the improvement comprising: hitch linkage having rear end means connected to the implement and front end means for connection to the tractor to connect the implement in trailing relation to the tractor and for adjustment relative to the tractor, said front end means mounting a portion of said linkage on the tractor for fore-and-aft shifting according to variations in operating load between the tractor and implement and said front end means further including a signal output member connected to and movable relative to the tractor in response to fore-and-aft shifting of said linkage portion; and mechanism for utilizing implement-to-tractor operating loads selectively in either a power-operated phase or a mechanical weight-transfer phase, including force-transmitting means connected to the signal output member and having means optionally connectible to either the signal-receiving means or the linkage for utilizing load forces from the implement and linkage through said signal output member to control the actuator or to impose said forces back to the linkage.

14. For a tractor and associated implement wherein the tractor includes a power-operated lift arm, an actuator for starting and stopping said arm and a draft-control signal-receiving means for controlling the actuator, the improvement comprising: hitch linkage including upper and lower fore-and-aft hitch links between the tractor and implement and having rear ends pivotally connected to the implement on transverse axes and having front ends adjacent to the tractor; first means pivotally connecting the front end of one link to the tractor on a transverse axis; second means connecting the front end of the other link to the tractor and including a signal output member connected to and carried by the tractor for movement relative to the tractor and pivoted to said other link front end on a transverse axis whereby the linkage is vertically swingable and whereby said other link is shiftable fore-and-aft in response to variations in draft load so as to shift the signal output member; biasing means optionally connectible or disconnectible between the tractor and the signal output member and operative when connected to yieldingly oppose shifting of said member in at least one direction; a lift connection between at least one of the links and the lift arm for incurring vertical swinging of the links and implement by movement of said arm; and first and second force-transmitting elements connected respectively to the lift arm and to the signal-receiving means, each element being bi-positionable and having a first position connected to the signal output and a second position disconnected from said signal output member, said elements being arranged for selective operation with either in its first position and the other in its second position.

15. The invention defined in claim 1, in which: the biasing means includes a first portion connected to the tractor and a second portion detachably connected to the signal output member for operation in a first condition when said second portion is connected to said member and for inaction in a second condition when said second portion is detached from said member; and means is provided on the tractor for releasably engaging said second portion when detached from said member.

16. The invention defined in claim 1, in which: the biasing means includes a first portion having a pivotal connection to the tractor and a second portion detachably connected to the signal output member for operation in a first condition when said second portion is connected to said member and for swinging about said pivotal connection to a second condition clear of said member when said second portion is detached from said member.

References Cited in the file of this patent

UNITED STATES PATENTS

| 2,358,281 | Ray | Sept. 12, 1944 |
| 2,445,145 | Love | July 13, 1948 |
| 2,714,346 | Valin | Aug. 2, 1955 |
| 2,785,616 | Jones | Mar. 19, 1957 |
| 2,822,738 | Smith | Feb. 11, 1958 |

FOREIGN PATENTS

| 835,405 | Germany | Mar. 31, 1952 |